(12) United States Patent
Grosch et al.

(10) Patent No.: US 9,389,971 B2
(45) Date of Patent: Jul. 12, 2016

(54) REDUNDANT AUTOMATION SYSTEM AND METHOD FOR OPERATING THE REDUNDANT AUTOMATION SYSTEM

(71) Applicants: Thomas Grosch, Roβtal (DE); Jürgen Laforsch, Karlsruhe (DE); Albert Renschler, Ettlingen (DE)

(72) Inventors: Thomas Grosch, Roβtal (DE); Jürgen Laforsch, Karlsruhe (DE); Albert Renschler, Ettlingen (DE)

(73) Assignee: Siemens Aktiengesellschaft, Munich (DE)

( * ) Notice: Subject to any disclaimer, the term of this patent is extended or adjusted under 35 U.S.C. 154(b) by 178 days.

(21) Appl. No.: 13/864,922

(22) Filed: Apr. 17, 2013

(65) Prior Publication Data

US 2013/0290776 A1    Oct. 31, 2013

(30) Foreign Application Priority Data

Apr. 27, 2012 (EP) .................................... 12166006

(51) Int. Cl.
| | |
|---|---|
| *G06F 11/00* | (2006.01) |
| *G06F 11/20* | (2006.01) |
| *G05B 9/03* | (2006.01) |
| *G05B 19/042* | (2006.01) |
| *G06F 11/16* | (2006.01) |

(52) U.S. Cl.
CPC .............. *G06F 11/2023* (2013.01); *G05B 9/03* (2013.01); *G05B 19/0428* (2013.01); *G06F 11/1687* (2013.01); *G06F 11/2097* (2013.01); *G05B 2219/24183* (2013.01); *G05B 2219/24187* (2013.01); *G05B 2219/24189* (2013.01); *G05B 2219/34398* (2013.01); *G05B 2219/50222* (2013.01); *G06F 11/1695* (2013.01); *G06F 11/2033* (2013.01)

(58) Field of Classification Search
CPC .................................................... G06F 11/2097
USPC ....................................................... 714/12, 13
See application file for complete search history.

(56) References Cited

U.S. PATENT DOCUMENTS

| | | | |
|---|---|---|---|
| 4,589,066 A * | 5/1986 | Lam et al. ...................... | 713/375 |
| 5,384,906 A * | 1/1995 | Horst ............................. | 713/375 |
| 6,356,795 B1 | 3/2002 | Barthel et al. | |
| 7,007,106 B1 * | 2/2006 | Flood et al. ................... | 709/248 |
| 7,024,250 B2 | 4/2006 | Graf et al. | |

(Continued)

FOREIGN PATENT DOCUMENTS

| | | |
|---|---|---|
| CN | 1303497 | 7/2001 |
| CN | 1993679 | 7/2007 |

(Continued)

OTHER PUBLICATIONS

Siemens-Katalog ST 70, Edition 2011.

*Primary Examiner* — Yolanda L Wilson
(74) *Attorney, Agent, or Firm* — Cozen O'Connor (57) ABSTRACT

A redundant automation system and a method for operating the redundant automation system which is provided with a first subsystem and a second subsystem that each process a control program while controlling a technical process, one of these subsystems operating as a master and the other subsystem operating as a slave, and the slave assuming the function of the master if the master fails such that it becomes possible to dispense with temporally synchronous communication between the participants with regard to the synchronization of the program processing in the two subsystems, thus reducing the communication load.

12 Claims, 5 Drawing Sheets

(56) References Cited

U.S. PATENT DOCUMENTS

| | | | |
|---|---|---|---|
| 7,363,431 B1* | 4/2008 | Niver et al. | 711/141 |
| 2002/0095221 A1* | 7/2002 | Cook et al. | 700/4 |
| 2002/0184410 A1* | 12/2002 | Apel et al. | 710/5 |
| 2006/0056285 A1 | 3/2006 | Krajewski, III et al. | |
| 2011/0202923 A1 | 8/2011 | Matsubayashi et al. | |

FOREIGN PATENT DOCUMENTS

| | | |
|---|---|---|
| DE | 3633953 | 4/1988 |
| DE | 19625195 | 1/1998 |
| EP | 0 907 912 | 5/2000 |
| EP | 1 136 896 | 9/2001 |
| EP | 1 388 397 | 2/2004 |

* cited by examiner

REDUNDANT AUTOMATION SYSTEM AND METHOD FOR OPERATING THE REDUNDANT AUTOMATION SYSTEM

BACKGROUND OF THE INVENTION

1. Field of the Invention

The invention relates to a redundant automation system and method for operating the redundant automation system which is provided with a first subsystem and a second subsystem, where the subsystems each redundantly process a control program while controlling a technical process, and one of these subsystems operate as a master and the other subsystem operates as a slave, and the slave assumes the function of the master if the master fails.

2. Description of the Related Art

In the automation environment, there is an increasing demand for highly available solutions (H systems) that are suitable for minimizing possible downtimes of an installation. The development of such highly available solutions is very cost-intensive, where an H system usually used in the automation environment is distinguished by the fact that two or more subsystems in the form of automation devices or computer systems are coupled to one another via a synchronization connection. In principle, both subsystems can have read and/or write access to peripheral units connected to this H system. One of the two subsystems leads with respect to the peripherals connected to the system. This means that outputs to peripheral units or output information for these peripheral units is/are effected only by one of the two subsystems which operates as a master or has assumed the master function. So that both subsystems can run in a synchronous manner, the subsystems are synchronized at regular intervals via the synchronization connection. With respect to the frequency and extent of synchronization, different forms may be distinguished (e.g., warm standby, hot standby).

An H system often requires a smooth "failover", if one of the subsystems fails and it is necessary to change over to the other subsystem. This means that, despite this unplanned changeover or this unplanned change from one subsystem to the other, this changeover or change does not have a disruptive effect on the technical process to be controlled. Here, it is permissible for a (short) dead time, during which the outputs remain at their last valid process output values, to occur at the outputs of the connected peripherals. However, a jump (surge) in the values at these outputs on account of the changeover is undesirable and should therefore be avoided. Therefore, "smooth" should also be understood as meaning the continuity of the curve shape of the process output values.

In order to achieve this smoothness, the two subsystems must have the same system state at the time of the failure. This is ensured by the suitable synchronization method. If both subsystems are processing the input information (inputs) of the process, both systems are in the same system state when they change their respective "thread global" data (shared data of programs, i.e., programs with different priorities) in the same manner given the same process input data or process input information. In order to achieve this, the synchronization method ensures that the individual threads of the two subsystems are interrupted or executed in the same manner. This results in an identical "thread mountain".

The Siemens catalog ST 70, chapter 6, 2011 edition, discloses a redundant automation system that consists of two subsystems and is intended to increase the availability of an installation to be controlled. For this purpose, the automation system is provided with means that initially decide, based on an event, which program must be started in order to suitably react to the event. If, for example, during the execution of a program, an event in the form of a pending alarm for the technical process to be controlled is applied to a signaling input of the automation system, the running program is usually stopped at a waiting point and a program that is intended to analyze the alarm and initiate measures that eliminate the cause of the alarm is started. This automation system is regularly synchronized, and it is ensured that the failure of one of these subsystems does not have a disruptive effect on a process to be controlled because the other subsystem can continue the execution or processing of the corresponding part of its respective control program or the execution or processing of the corresponding parts of this control program.

If, for example, an event that has occurred in a first subsystem is not synchronized with a second subsystem of an automation system comprising two subsystems and, after the event has been processed by the first subsystem, this subsystem fails, the course of a technical process to be controlled may be disrupted. This is because the second subsystem (without knowledge of the event) runs through a different program path, representing the execution order of the programs, from the program path that would be run through by the second subsystem with knowledge of the event and that would also be necessary to avoid disrupting the course of the technical process to be controlled.

In this context, it should be noted that a program is understood as meaning both a program as such and a subroutine, a part of a program, a task, a thread, an organizational module, a functional module or another suitable program code for implementing an automation function, where the programs of an automation system usually are categorized into priority classes and are processed or executed according to their associated priority.

EP 0 907 912 B1 discloses a synchronization method for an automation system constructed from two subsystems. This synchronization method is based on temporally synchronous coupling of the two subsystems, both subsystems waiting for a response from the respective other participant at suitable program points at which adjustment is intended and only then respectively continuing their program processing in a temporally synchronous manner. The disadvantage is the long waiting times before receiving the responses needed for the temporal synchronization.

US 2002/0095221 A1 describes a redundant automation system provided with a first controller and a second controller. Suitable measures that make it possible to execute periodic tasks in a timely manner are provided.

SUMMARY OF THE INVENTION

It is therefore an object of the invention to provide a redundant automation system and method which makes it possible to dispense with temporally synchronous communication between the participants with regard to the synchronization of the program processing in the two subsystems.

This and other objects and advantages are achieved in accordance with the invention by an automation system and method in which the master advantageously does not have to (actively) wait for a response from the slave to be able to continue its program processing. That is, all relevant information is transmitted from the master to the slave in a temporally asynchronous manner. As a result, the processing performance of the master is decoupled from the communication bandwidth available for event synchronization, which is important, in particular, with regard to the increasing imbalance between the increase in the processing performance of the processors, on the one hand, and the increase in the communication performance, on the other hand. This is because the communication performance usually cannot keep up with the increasing processing performance.

After an event has occurred, the two subsystems are synchronized in a synchronous manner such that both the master and the slave run through the same program paths on account of this event, the runs being effected in a temporally asynchronous manner. Thus, the master temporally leads the slave or the slave temporally trails the master with regard to the program processing. In this context, "trailing" or "leading" is understood as meaning the time difference between the beginning of the processing of the processing sections by the master and the beginning of the processing of the processing sections by the slave, which corresponds to the time at which the release signal occurs.

On account of the temporally asynchronous communication between the master and the slave, it is also possible to use slow communication connections for setting up a highly available automation system. Thus, it is also possible to provide a communication connection that is poor per se with regard to the transmission bandwidth or response time or else a communication connection that is also used by other communication participants and is thus not exclusively available to the two participants for synchronization purposes. It is therefore possible to dispense with a separate synchronization connection. Furthermore, large distances between the two participants may also be overcome without impairing the system performance too much as a result of long signal propagation times or long latency times.

In one embodiment of the invention, the master is used to also transmit process input values to the slave at the time at which the current releases are transmitted. The information relevant to the slave is initially combined or collected and is finally transmitted to the slave. In contrast with known temporal synchronization methods, during which relevant information must be immediately transmitted to the slave, this means a considerably reduced amount of "management effort" both for the master and for the slave or the reserve.

In another embodiment of the invention, the slave acknowledges the respective release to the master after the respective processing sections have been processed. The number of unacknowledged releases makes the master aware of the current trailing of the slave, as a result of which the master can take suitable measures to prevent the temporal trailing from becoming too great.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention, its refinements and advantages are explained in more detail below using the drawing which illustrates an exemplary embodiment of the invention and in which.

DETAILED DESCRIPTION OF THE PREFERRED EMBODIMENTS

The same parts in FIGS. 1 to 4 are provided with the same reference symbols.

Figure 4:
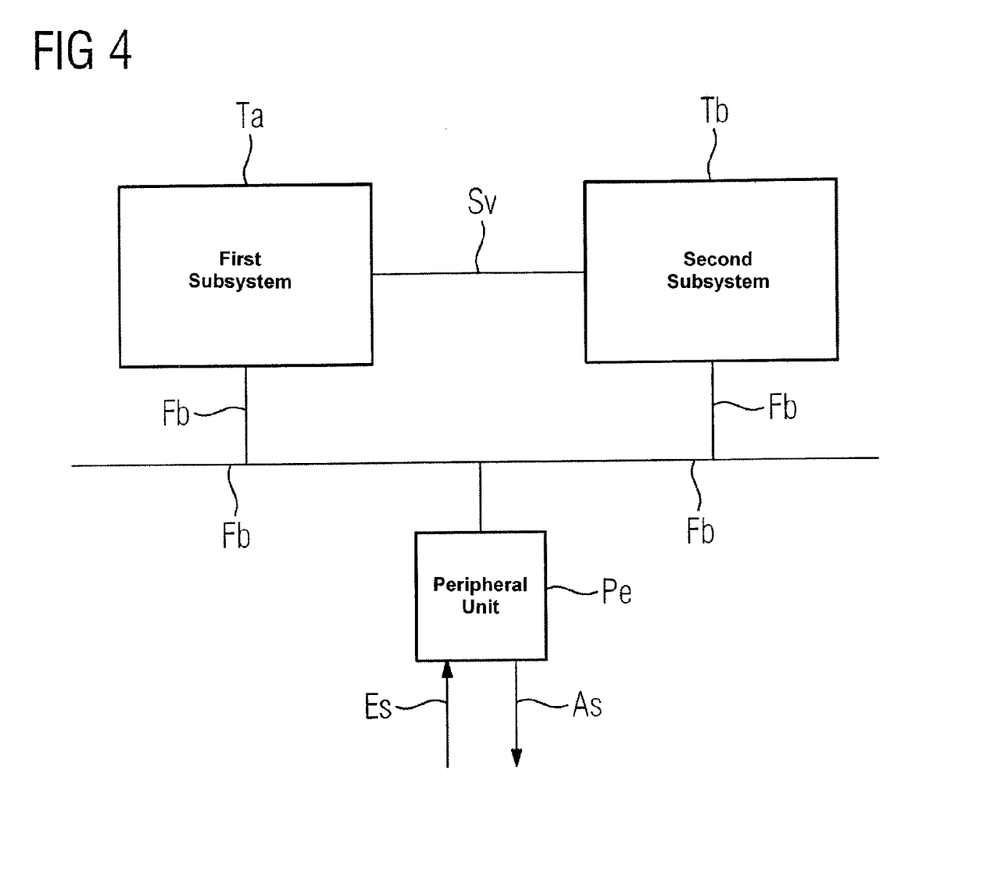
FIG. 4 shows a redundant automation system.

Reference is initially made to FIG. 4 which illustrates a redundant automation system that is known per se and comprises two subsystems. A first subsystem Ta and a second subsystem Tb are connected to a peripheral unit Pe via a field bus Fb. Here, the field bus Fb complies with the PROFIBUS-DP specification, for example.

In principle, other bus systems, such as Ethernet, Fieldbus, Modbus or parallel bus systems, are also suitable. The peripheral unit Pe receives, via input lines Es, signals from transducers or measuring transducers, which are used to detect a process state, and outputs, via output lines As, signals to actuators that are used to influence the process. The process as well as the transducers, measuring transducers and actuators are not illustrated in the figure for purposes of clarity. The two subsystems Ta, Tb execute the same control program in a cyclical and synchronous manner. A synchronization connection Sv is provided to synchronize the subsystems, the redundancy and monitoring functions being implemented via this synchronization connection Sv.

Figure 1:
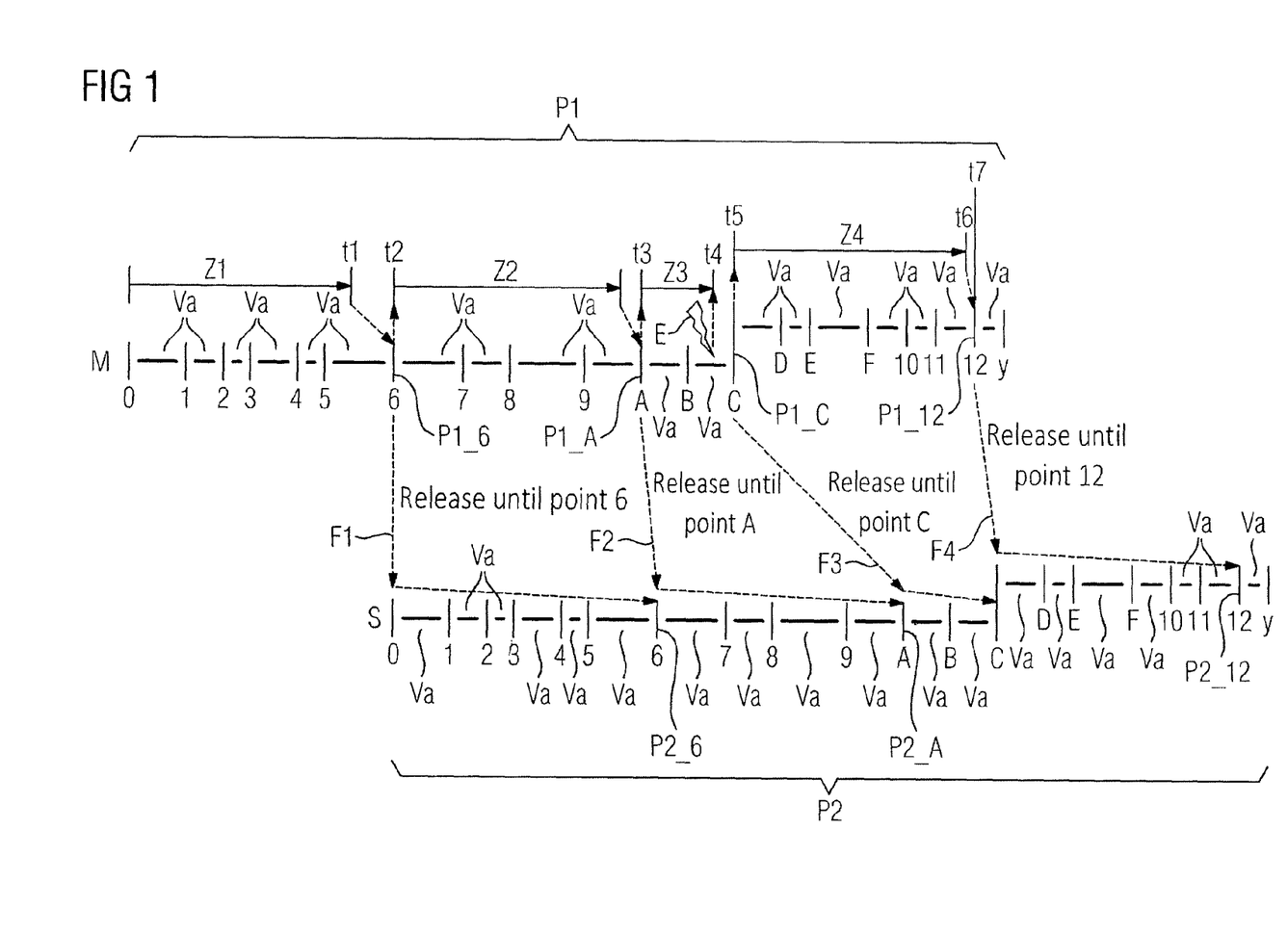
FIGS. 1 to 3 show sequences of temporally asynchronous coupling of two subsystems.

In order to explain event-synchronous processing of the control programs, reference is made below to FIGS. 1 to 3 that illustrate sequences of temporally asynchronous coupling of two subsystems. In this context, "event-synchronous processing" means that both the master and the slave run through the same program paths of the respective control program on account of an event, the runs being effected in a temporally asynchronous manner.

It is assumed that one subsystem is operated as a master M and one subsystem is operated as a slave S or a reserve. The master M therefore leads with respect to the control of a technical process and undertakes process control, the master reading the process input information or process input values from the peripheral unit Pe (FIG. 4) and making it/them available to the slave S in a temporally asynchronous manner. The slave S assumes the master function or the role of master only if the master M fails on account of a fault.

The master M processes a program P1 for controlling the technical process, the slave S also processing a program P2 corresponding to this control program P1. Both control programs P1, P2 have a multiplicity of processing sections (Va) of different duration, the control programs P1, P2 being able to be interrupted at the respective beginning and the respective end of each processing section Va. The beginning and end of each processing section Va, which usually comprises a multiplicity of program codes, therefore represent interruptible program points or breakpoints $0, 1, 2, \ldots y$. If necessary, the respective control program P1, P2 can be interrupted at these points $0, 1, 2, \ldots y$ using the master M and the slave S in order to be able to initiate suitable reactions after an event or a process alarm has occurred. Furthermore, the respective control program P1, P2 can be interrupted at these breakpoints $0, 1, 2, \ldots y$ so that the master M and the slave S can interchange releases, acknowledgements or other information via the field bus Fb or via the synchronization connection Sv (FIG. 4). After a respective predefinable or predefined interval of time $Z_i$, $i=1, 2, \ldots y$ has expired and at the respective time at which a breakpoint following the expiry of the respective interval of time $Z_i$ occurs, preferably the first breakpoint following the respective interval of time $Z_i$, the master M transmits a release or release signal to the slave S, which release or release signal indicates to the slave S the processing section Va up to which the slave S can process the control program P2. These processing sections Va of the control program P2 correspond to those that have already been processed by the master M during the processing of the control program P1. In the present exemplary embodiment, it is assumed that, after an interval of time Z1 has expired, the master M transmits a release F1 to the slave S at a time t1 and at a time t2 at which a first breakpoint P1_6 (breakpoint 6) follows the interval of time Z1. This release F1 comprises the information for the slave S indicating that the latter can process its control program P2 to be processed up to a breakpoint P2_6 (breakpoint 6), the breakpoint P2_6 of the control program P2 corresponding to the breakpoint P1_6 of the control program P1. This means that, based on the release, the slave S can process those processing sections Va of the control program P2 that correspond to the processing sections Va of the control program P1 up to the time at which the release or the release signal is generated, in which case it is assumed in the example for the sake of simplicity that the time at which the release is generated corresponds to the time at which the release is transmitted to the slave S. These processing sections Va are therefore processed using the slave S in a temporally asynchronous manner with respect to the processing of the corresponding processing sections Va using the master M, the slave S processing further processing sections Va, after the processing sections Va of the control program P2 have been processed by the slave S, only when the master M transmits a further release to the slave S. The time at which this breakpoint P1_6, P2_6 (breakpoint 6) occurs represents the beginning of an interval of time Z2 following the interval of time Z1.

The further temporally asynchronous processing of the control programs P1, P2 is performed in the described manner. At a time t3 at which a first breakpoint P1_A occurs after the expiry of the interval of time Z2, the master M transmits a further release F2 to the slave S, which release indicates to the slave S that the latter can process further processing sections Va up to the breakpoint P2_A. These processing sections Va again correspond to those which have already been processed by the master M from the time t2 to the time t3, i.e., up to the breakpoint P1_A. This means that the slave S processes the processing sections Va from the time t2 of the previous release F1 to the time t3 of the current release F2. The time t3 at which the first breakpoint P1_A has occurred after the expiry of the interval of time Z2 is the beginning of an interval of time Z3 following the interval of time Z2.

An event, such as an event comprising a process alarm, may now occur during an interval of time. In the exemplary embodiment, E is used to denote such an event to which the master M must react in a suitable manner during the interval of time Z3 at a time t4 in accordance with the control program P1. In this case, the master M does not transmit a release F3 to the slave S at a time at which a breakpoint following the interval of time Z3 occurs after the interval of time Z3 but rather at a time t5 at which a breakpoint P1_C (breakpoint C) following the occurrence of the event E occurs. This means that the interval of time Z3 is shortened on account of the event E, the time t5 being the beginning of a following interval of time Z4. Based on the release F3 transmitted to the slave S, the slave S processes those processing sections Va of the control program P2 that correspond to those processing sections Va of the control program P1 that have already been processed by the master M between the times t3 and t5.

On account of the event E, the master M processes higher-priority processing sections Va during the interval of time Z4, for example, the master M performs a thread change at the time t5 and, after the interval of time Z4 has expired at the time t6, again transmits a release F4 at a time t7 at which a first breakpoint P1_12 (breakpoint 12) following the interval of time Z4 occurs. Based on this release, the slave S likewise processes processing sections Va up to a breakpoint P2_12 (breakpoint 12) in the control program P2, these processing sections Va corresponding to the processing sections Va of the control program P1 between the times t5 and t7, and the slave S likewise perform a thread change.

As explained, the releases from the master M make it possible for the slave S to run through the same "thread mountain" as the master M, which means that the slave S performs a "thread change" at a point in the control program P2 corresponding to the point in the control program P1. The slave S continues its processing only when requested to do so by the master M by means of a release. With regard to the processing of the processing sections, the master M processes them in real time like in stand-alone operation or in non-redundant operation and issues releases for corresponding processing sections to be processed by the slave S at regular intervals of time and after the occurrence of events, the master M continuing to process its control program P1 and not actively waiting for a response from the slave S. With regard to the processing of the corresponding processing sections, the slave S trails the master M and processes the sections based on the issued master releases.

Figure 2:
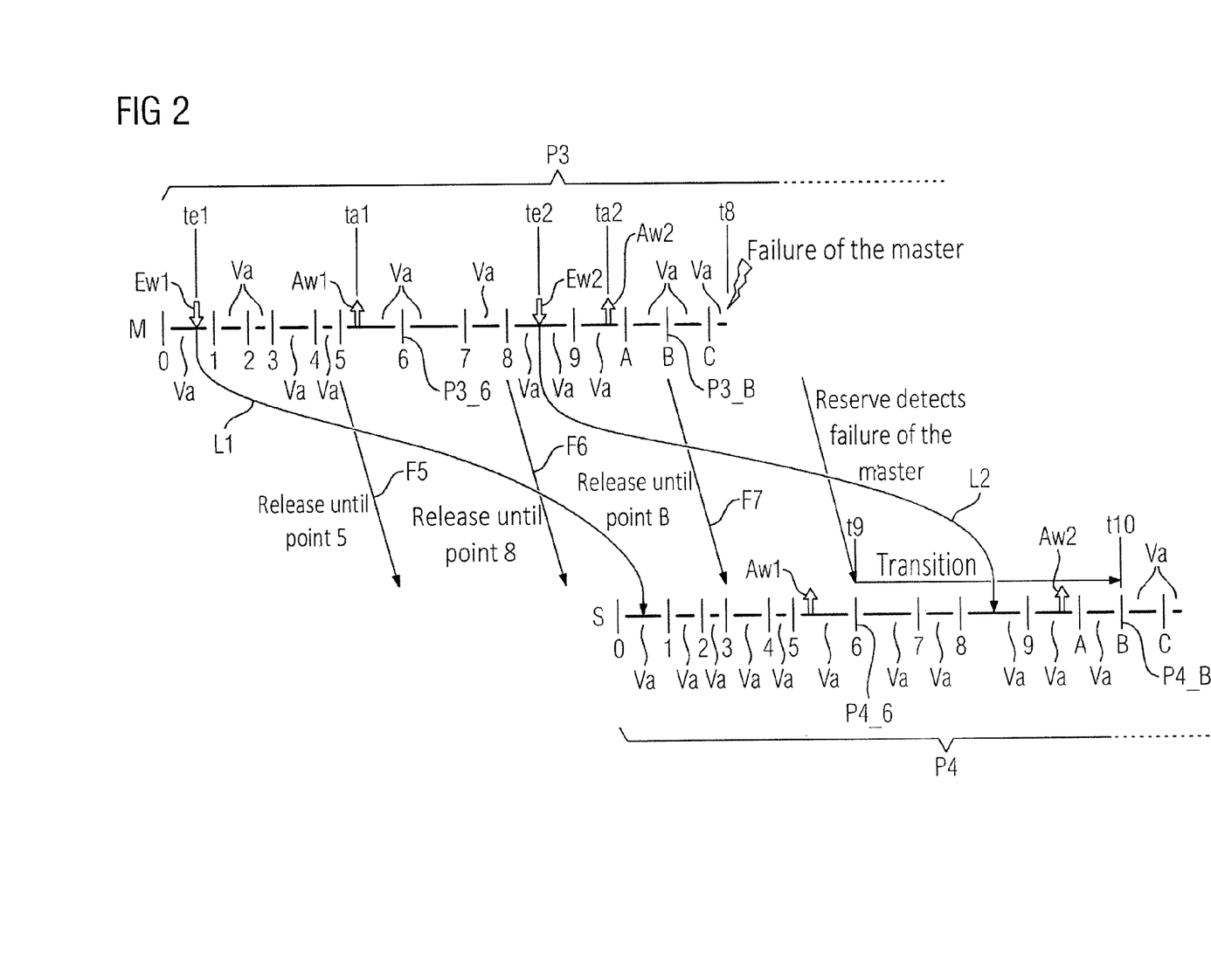
Figure 3:
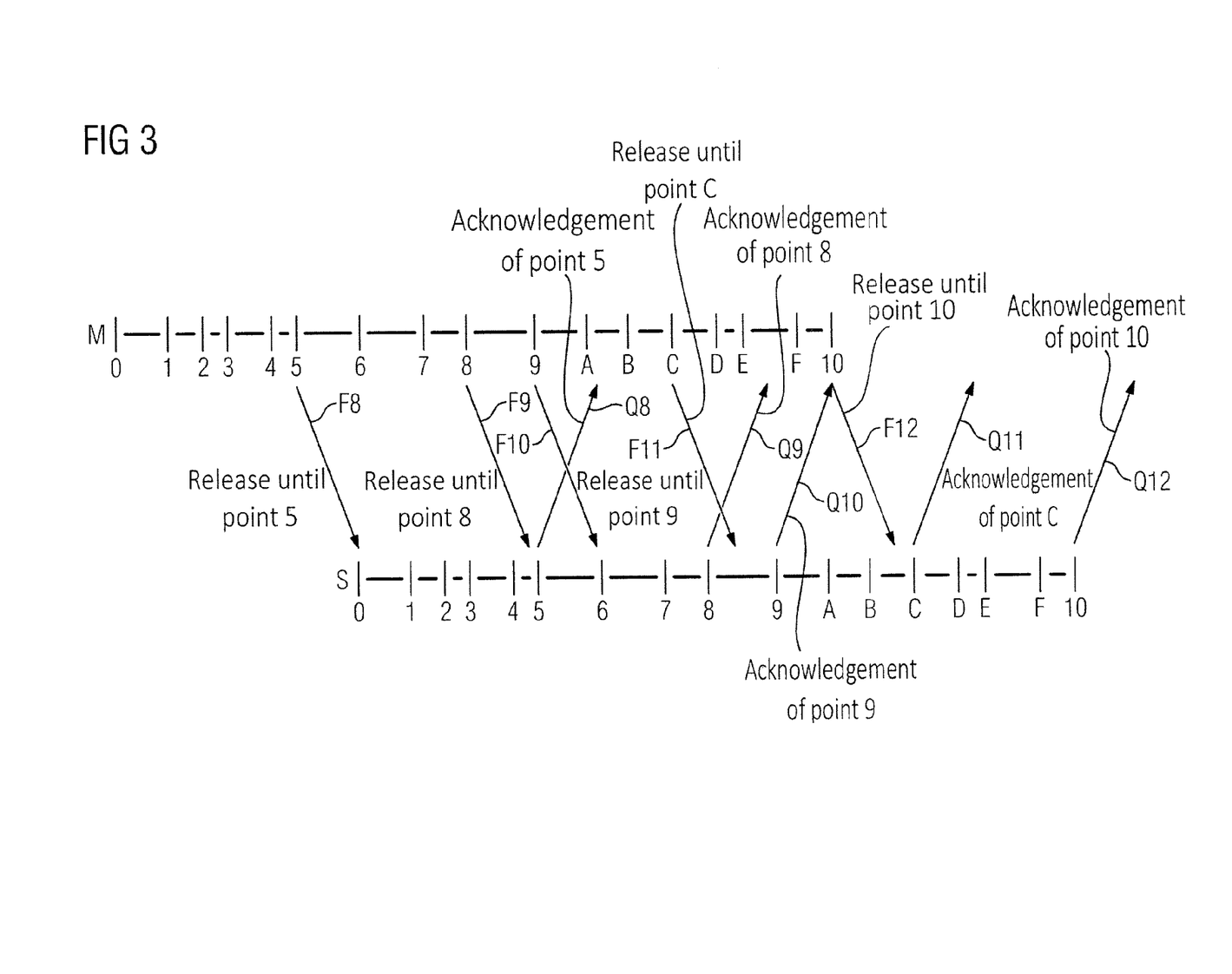

Reference is made below to FIG. 2 which illustrates a transition of the role of master from the master M to the slave S. The master M transmits releases F5, F6, F7 to the slave S in the described manner, in which case it is assumed that the master M fails at a time t8.

Based on the releases F5 to F7, the slave S processes the processing sections Va of a control program P4 up to a breakpoint P4_B (breakpoint B), these processing sections Va corresponding to those processing sections Va of a control program P3 that have been processed using the master M up to the breakpoint P3_B (breakpoint B).

At times te1, te2, the master M has read access to the peripheral unit Pe within the scope of the processing of the control program P3, which means that the master M reads in process input values Ew1, Ew2, processes them in accordance with the control program P3 and generates process output values Aw1, Aw2 that are transmitted to the peripheral unit Pe at times ta1, ta2 by the master M. The master M transmits the process input values Ew1, Ew2 to the slave S, which is indicated in the drawing by curved lines L1, L2. The transmission is effected together with the releases F5, F7 to avoid increasing the communication load between the master M and the slave S while processing the processing sections Va up to these releases F5, F7. The slave S likewise processes these process input values Ew1, Ew2 in accordance with the control program P4 and likewise generates the process output values Aw1, Aw2 that are transmitted to the peripheral unit Pe by the slave S. In this case, it is assumed that the peripheral unit Pe is a "switched" peripheral unit having a primary connection and a secondary connection. The primary connection is intended to receive the process output values from the master M and the secondary connection is intended to receive the process output values from the slave S, the slave S changing over the peripheral unit from the primary connection to the secondary connection if the slave S detects that the master M has failed.

As explained, it is assumed that the master M fails at a time t8. The slave S detects the failure, for example, by virtue of the fact that the master M has not transmitted any sign of life to the slave S via the synchronization connection Sv or the field bus Fb (FIG. 4) during a predefined duration. After the slave S has detected the failure, such as at a time t9, the slave S does not immediately assume the role of master; this is because the system state of the slave S differs from that of the master M at this time t9 and a smooth change or transition is therefore impossible. At this time t9, the slave S has only processed the processing sections Va up to a breakpoint P4_6 (breakpoint 6) and the corresponding processing sections Va of the master M up to a breakpoint P3_6 (breakpoint 6) therefore "lie" in the past. Only after a transition, i.e., after the slave S has processed the processing sections Va released using the release F7 up to the breakpoint P4_B at a time t10, does the slave S assume the role of master and thus the control of the technical process, the slave S changing over the peripheral unit from the primary connection to the secondary connection at this time t10. During this transition, the (previous) slave S therefore still runs through the same thread mountain with path synchronization and processes the same process input values as those processed by the (previous) master M before its failure, the (previous) slave S determining the same process output values as the (previous) master M based on these input values. The transition is ended when the aim of the last release (the processing of the processing sections Va up to the breakpoint P4_B in the present example) has been achieved.

The duration of the transition substantially corresponds to the duration of the temporal trailing at the "failover" time. In order to keep the temporal trailing at a tolerable degree, every release F8 to F12 (FIG. 3) from the master M is then acknowledged by the slave S in an asynchronous manner using respective acknowledgements Q8 to Q12 if the slave S has concluded the respective processing. The master M evaluates the number of unacknowledged releases and determines the current trailing of the slave S therefrom. If the temporal trailing is too high or too long, which may result in a loss of redundancy, for example, the master M takes suitable measures to reduce the temporal trailing or to avoid it becoming too large.

For example, the master M can suspend or delay the processing of low-priority threads in response to excessive trailing, the processing of the higher-priority threads requiring considerably less than 100% of the computation time. The master M therefore has fewer processing sections to run through and generates fewer releases, with the result that the slave S or the reserve can "catch up".

Figure 5:
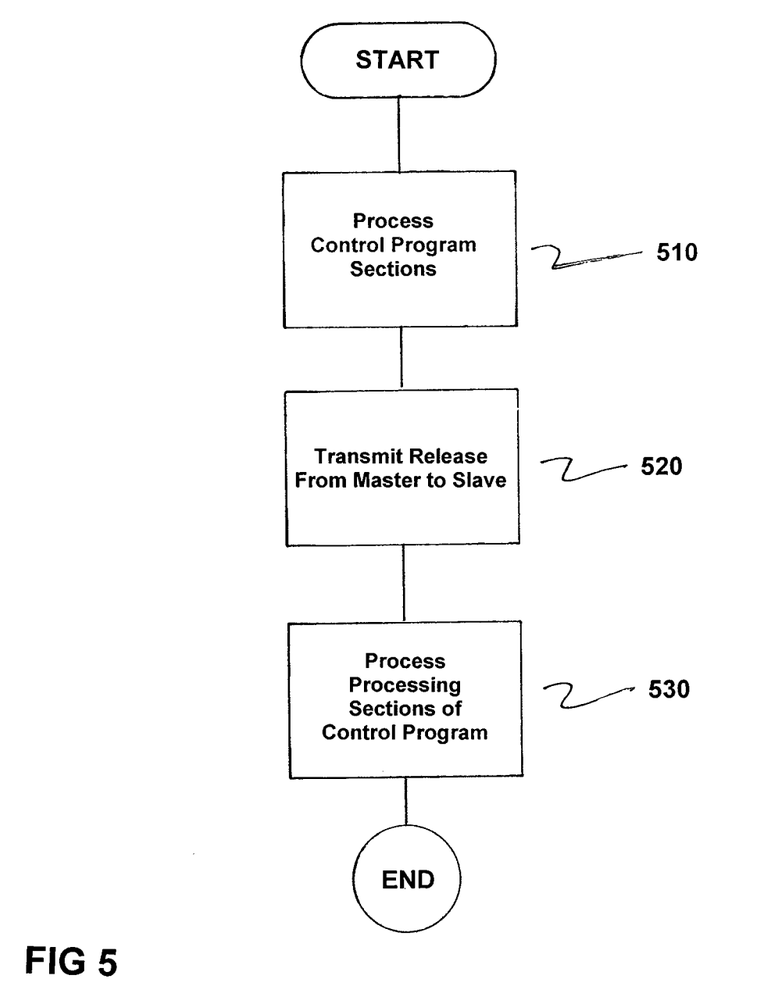
FIG. 5 is a flowchart of the method in accordance with the invention.

FIG. 5 is a flowchart of a method for operating a redundant automation system provided with a first subsystem and a second subsystem, where the subsystems each process a control program while controlling a technical process, where one of the subsystems operates as a master and another of the subsystems operates as a slave which functions as the master if the master fails. The method comprises processing sections of the control program to be processed using the master, as indicated in step 510. A release is then transmitted from the master to the slave in either after a predefined interval of time has expired or after an event has occurred, as indicated in step 520. Next, those processing sections of the control program to be processed are processed, based on the release, using the slave that corresponds to those processing sections of the control program to be processed using the master which has already been processed up to the release, as indicated in step 530.

While there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for operating a redundant automation system provided with a first subsystem and a second subsystem, which subsystems each process a control program while controlling a technical process, one of said subsystems operating as a master and another of said subsystems operating as a slave which functions as the master if the master fails, the method comprising the steps of:
    processing sections of the control program to be processed using the master;
    transmitting from the master a release to the slave via one of (i) a field bus and (ii) a synchronization connection in each case one of (i) after a predefined interval of time has expired and (ii) after an event has occurred; and
    processing, based on the release, those processing sections of the control program to be processed in a temporally asynchronous manner using the slave which corresponds to those processing sections of the control program to be processed using the master which has already been processed up to the release.

2. The method as claimed in claim 1, wherein the slave acknowledges a respective release to the master after respective processing sections have been processed.

3. The method as claimed in claim 2, further comprising the steps of:
    providing breakpoints at a beginning and an end of a respective processing section;
    providing one of (a) a time at which a breakpoint following a respective interval of time occurs and (b) a time at which a breakpoint following an occurrence of an event occurs as a beginning of an interval of time following the respective interval of time; and
    transmitting the release to the slave at the time of (a) and (b).

4. The method as claimed in claim 1, further comprising the steps of:
    providing breakpoints at a beginning and an end of a respective processing section;
    providing one of (a) a time at which a breakpoint following a respective interval of time occurs and (b) a time at which a breakpoint following an occurrence of an event occurs as a beginning of an interval of time following the respective interval of time; and
    transmitting the release to the slave at the time of (a) and (b).

5. The method as claimed in claim 1, further comprising the step of:
    transmitting process input values from the master to the slave at a time at which releases are transmitted.

6. A redundant automation system including a first subsystem and a second subsystem, which subsystems each process a control program while controlling a technical process, one of said subsystems operating as a master and another of said subsystem operating as a slave which functions as the master if the master fails;

wherein the master is configured to process processing sections of the control program to be processed using the master and to transmit a release to the slave via one of (i) a field bus and (ii) a synchronization connection in each case one of (i) after a predefined interval of time has expired and (ii) after an event has occurred; and wherein the slave is configured to process based on the release, processing sections of the control program to be processed in a temporally asynchronous manner using the slave which correspond to those processing sections of the control program to be processed by the master which have already been processed up to the release.

7. The redundant automation system as claimed in claim 6, wherein the slave is further configured to acknowledge a respective release to the master after respective processing sections have been processed.

8. The redundant automation system as claimed in claim 7, wherein the automation system is configured to provide breakpoints control programs to be processed using the master and using the slave in each case at a beginning and at an end of a respective processing section;

wherein the master is configured to provide one of (a) a time at which a breakpoint following a respective interval of time occurs and (b) a time at which a breakpoint following an occurrence of an event occurs at the beginning of the respective interval of time following the respective interval of time; and wherein the master is further configured to transmit the release to the slave at the time of one of (a) and (b).

9. The redundant automation system as claimed in claim 6, wherein the automation system is configured to provide breakpoints control programs to be processed using the master and using the slave in each case at a beginning and at an end of a respective processing section;

wherein the master is configured to provide one of (a) a time at which a breakpoint following a respective interval of time occurs and (b) a time at which a breakpoint following an occurrence of an event occurs at the beginning of the respective interval of time following the respective interval of time; and wherein the master is further configured to transmit the release to the slave at the time of one of (a) and (b).

10. The redundant automation system as claimed in claim 6, wherein the master is further configured to transmit process input values to the slave at a time at which releases are transmitted.

11. A slave for a redundant automation system having a master and another slave, the master and the slave each processing a control program while controlling a technical process, and the slave functioning as the master if the master fails;

wherein the slave is configured to process, based on a release transmitted via one of (i) a field bus and (ii) a synchronization connection by the master processing sections of the control program to be processed using the slave which correspond to those processing sections of the control program to be processed by the master which have already been processed up to the release; and wherein the slave is further configured to process further processing sections of its control program in a temporally asynchronous manner only if the master transmits a further release to the slave after this processing.

12. A master for a redundant automation system having a slave and the master, the master and the slave each processing a control program while controlling a technical process, and the slave functioning as the master if the master fails;

wherein the master is configured to process processing sections of the control program to be processed using the master and to transmit a release to the slave via one of (i) a field bus and (ii) a synchronization connection in each case one of (i) after a predefined interval of time has expired and (ii) an event has occurred, the release indicating to the slave that it should process processing sections of the control program to be processed in a temporally asynchronous manner using the slave which correspond to those processing sections of the control program to be processed by the master which have already been processed up to the release.

\* \* \* \* \*